March 10. 1925.

S. H. VINNER

EMERGENCY HUB CAP

Filed Oct. 4, 1923

1,529,563

Witnesses:

Inventor
SAM H. VINNER.

By Richard B. Owen
Attorney

Patented Mar. 10, 1925.

1,529,563

UNITED STATES PATENT OFFICE.

SAM H. VINNER, OF BILLINGS, MONTANA.

EMERGENCY HUB CAP.

Application filed October 4, 1923. Serial No. 666,550.

*To all whom it may concern:*

Be it known that I, SAM H. VINNER, a citizen of the United States, residing at Billings, in the county of Yellowstone and State of Montana, have invented certain new and useful Improvements in Emergency Hub Caps, of which the following is a specification.

This invention relates to automobiles, and other vehicles, and has special reference to a combined emergency hub cap and wheel puller.

In certain makes of automobiles, it is not unusual for the wheel hub casting to break away from the flange with which it is provided, and which serves to secure the spokes so that the body of the wheel revolves with its hub. When this occurs, the wheel will no longer revolve with the axle.

One important object of the invention is to provide an improved device which may be screwed on the outer end of the hub in place of the usual hub cap and which, when so positioned, will serve to engage the wheel spokes and thereby drive the wheel just the same as though there had been no fracture of the hub.

It is also common in automobiles to remove, at times, the wheels from the axles and it is usual to employ what is commonly known as a wheel puller for this purpose.

A second important object of the invention is to combine with this emergency hub cap means whereby the wheel may be pulled off the axle.

With the above and other objects in view as will be hereinafter apparent, the invention consists in general of certain novel details of construction and combinations of parts hereinafter more fully described, illustrated in the accompanying drawings, and specifically claimed.

In the accompanying drawings like characters of reference indicate like parts in the several views, and:

Figure 1:
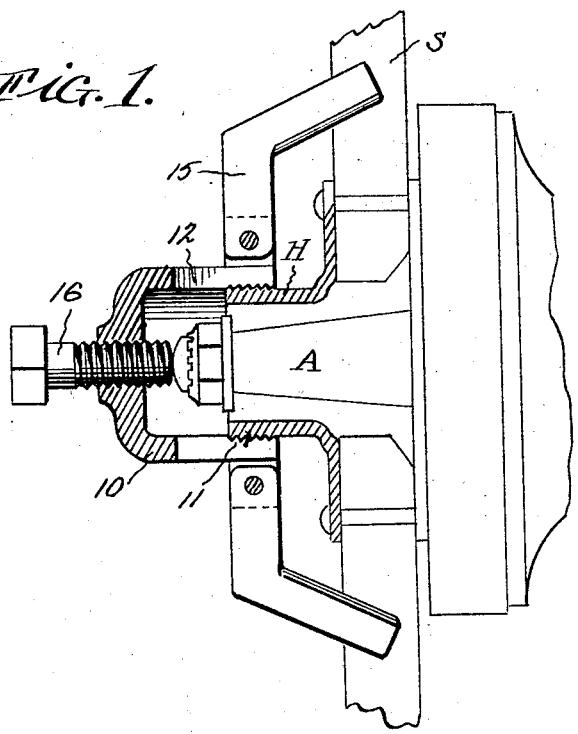
Fig. 1 is a section through an automobile hub and the improved device, the view showing the latter in position thereon.
Figure 2:
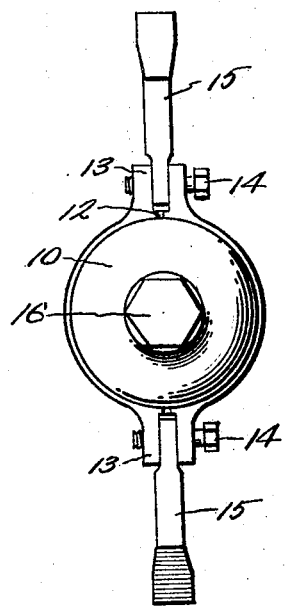
Fig. 2 is an end view of the improved device.
Figure 3:
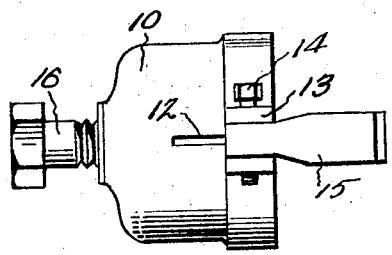
Fig. 3 is a side elevation thereof at right angles to Fig. 1.

The present embodiment of the invention is shown as being provided with a hollow body member 10 and cup-shaped, and having at its open end internal threads 11. At diametrically opposite points on this body there are provided slits 12, which extend longitudinally of the body from the threaded end toward the closed or outer end. At each side of each of these slits is a lug 13 so positioned that these lugs are arranged in pairs with the lugs of each pair on opposite sides of the respective slits. Extending through these lugs are the clamping bolts 14 which serve to bring the sides of the slits closer together when they are screwed up, and pivotally mounted on each of these bolts is a bent arm 15 having its end angularly disposed so that the free ends may project between the spokes S of the wheel and engage the same when the body is screwed on the hub H. Screwed through the closed end of the body is a set screw 16, this set screw being disposed centrally of the closed end so that it may bear against the axle A when the device is positioned to pull the wheel.

In the event of the hub being broken, the ordinary hub cap is removed, and this cap is screwed in its place. The arms 15 are swung between the spokes S and the bolts 14 screwed up. This action not only clamps the arms in position, but also clamps the body 10 firmly on the hub H so that backward revolution of the axle A will not cause unscrewing of the hub cap, but will cause the arms 15 to rotate the wheels. Thus the bolts 14 serve a double function.

When the device is to be used as a wheel puller, the body 10 is simply screwed on the hub, and the set screw 16 screwed inwardly in the manner common in such devices, this resulting in the wheel being pulled off of the axle A.

There has thus been provided a simple and efficient device of the kind described and for the purpose specified.

It is obvious that minor changes may be made in the form and construction of the invention without in any way departing from the material spirit thereof. It is not, therefore, desired to confine the invention to the exact form herein shown and described, but it is wished to include all such as properly come within the scope claimed.

Having thus described the invention, what is claimed as new, is:

An emergency hub cap including a hollow body member internally threaded to screw on a vehicle hub and provided with slits in its side walls extending longitudinally of the body from the threaded end, pairs of lugs extending outwardly from said threaded end, the lugs of each pair being disposed on opposite sides of a respective slit, clamp bolts passing through said lugs, spoke engaging arms pivoted between respective pairs of lugs on said clamp bolts, and a set screw threaded through the outer end of said body centrally thereof.

In testimony whereof I affix my signature in presence of two witnesses.

SAM H. VINNER.

Witnesses:
HARRY K. COHEN,
H. R. COHEN.